US012657002B2

(12) United States Patent
Fagan

(10) Patent No.: US 12,657,002 B2
(45) Date of Patent: Jun. 16, 2026

(54) INSPECTION APPARATUS AND METHODS

(71) Applicant: SHGI Corporation, Asheville, NC (US)

(72) Inventor: Terrence Arthur Fagan, Mokena, IL (US)

(73) Assignee: SHGI Corporation, Ashville (NC)

( * ) Notice: Subject to any disclaimer, the term of this patent is extended or adjusted under 35 U.S.C. 154(b) by 239 days.

(21) Appl. No.: 18/665,096

(22) Filed: May 15, 2024

(65) Prior Publication Data

US 2024/0394015 A1 Nov. 28, 2024

Related U.S. Application Data

(60) Provisional application No. 63/468,197, filed on May 22, 2023.

(51) Int. Cl.
| | |
|---|---|
| *G06F 3/16* | (2006.01) |
| *G06F 3/0484* | (2022.01) |
| *G06F 40/174* | (2020.01) |
| *G10L 15/02* | (2006.01) |
| *G10L 15/22* | (2006.01) |

(52) U.S. Cl.
CPC ............ *G06F 3/167* (2013.01); *G06F 3/0484* (2013.01); *G06F 40/174* (2020.01); *G10L 15/02* (2013.01); *G10L 15/22* (2013.01); *G10L 2015/223* (2013.01)

(58) Field of Classification Search
CPC ........................................................ G06F 3/167
USPC ........................................................ 715/256
See application file for complete search history.

(56) References Cited

U.S. PATENT DOCUMENTS

| | | | | |
|---|---|---|---|---|
| 8,059,882 B2 * | 11/2011 | Amidi | ................ | H04N 1/32101 |
| | | | | 382/141 |
| 8,630,991 B2 * | 1/2014 | Rao | ........................ | G06Q 10/10 |
| | | | | 707/726 |
| 9,081,550 B2 * | 7/2015 | Oz | ........................... | G06F 3/167 |
| 9,407,874 B2 * | 8/2016 | Laurentino | .............. | H04N 7/15 |
| 9,536,148 B2 * | 1/2017 | Gross | ................. | G06Q 30/0276 |
| 10,157,433 B2 * | 12/2018 | Randolph | ............ | G06Q 50/163 |

(Continued)

FOREIGN PATENT DOCUMENTS

| | | | | |
|---|---|---|---|---|
| AU | 2020103358 | 1/2021 | | |
| WO | 2021151163 | 8/2021 | | |
| WO | WO-2021151163 A1 * | 8/2021 | ............. | G06F 17/40 |

OTHER PUBLICATIONS

"All-in-One Home Inspection Software", believed to be available as early as Mar. 6, 2023, https://www.spectora.com.

*Primary Examiner* — Reza Nabi
(74) *Attorney, Agent, or Firm* — Fitch, Even, Tabin & Flannery LLP

(57) ABSTRACT

Systems and methods for conducting a property inspection are provided. A mobile computing device receives voice input from the user via an inspection application. The inspection application includes a plurality of features of a property and an associated information field that corresponds to each of the plurality of features for storing information about the feature. The mobile computing device identifies, from the voice input, a feature of the property in the voice input regardless of whether the feature is presented to the user on the display screen. The mobile computing device processes the voice input to identify a descriptor in the voice input and associates the descriptor with the feature in memory.

12 Claims, 6 Drawing Sheets

(56) References Cited

U.S. PATENT DOCUMENTS

| | | | | |
|---|---|---|---|---|
| 10,462,429 | B1 * | 10/2019 | Hillman | G06Q 40/08 |
| 10,489,813 | B1 * | 11/2019 | De Guia | G06Q 30/0217 |
| 10,546,253 | B2 * | 1/2020 | Messinger | G06Q 10/06311 |
| 10,672,089 | B2 * | 6/2020 | Howe | H04N 7/183 |
| 10,713,739 | B1 * | 7/2020 | Farnsworth | G06Q 50/16 |
| 10,825,094 | B2 * | 11/2020 | Schreier | G06Q 50/16 |
| 10,831,350 | B1 * | 11/2020 | de Guia | H04L 12/2803 |
| 10,861,115 | B1 * | 12/2020 | Stricker | G06Q 50/16 |
| 10,977,734 | B1 * | 4/2021 | Kenney | G06Q 40/08 |
| 11,003,334 | B1 * | 5/2021 | Conway | G06Q 40/08 |
| 11,037,255 | B1 * | 6/2021 | Ganev | G06Q 50/16 |
| 11,087,347 | B1 | 8/2021 | De Guia | |
| 11,200,629 | B2 * | 12/2021 | Lindy | G06F 3/0482 |
| 11,495,116 | B2 | 11/2022 | Linn | |
| 11,521,272 | B2 | 12/2022 | Schreier | |
| 2008/0301713 | A1 * | 12/2008 | Demarest | G06Q 10/10 |
| | | | | 719/317 |
| 2008/0301757 | A1 * | 12/2008 | Demarest | G06Q 10/10 |
| | | | | 726/1 |
| 2012/0254156 | A1 * | 10/2012 | Rao | G06Q 10/00 |
| | | | | 707/722 |
| 2012/0320204 | A1 * | 12/2012 | Dahlin | G08G 1/09623 |
| | | | | 348/148 |
| 2013/0185079 | A1 * | 7/2013 | Park | H04L 12/2818 |
| | | | | 340/3.7 |
| 2014/0129456 | A1 * | 5/2014 | Rao | G06Q 10/00 |
| | | | | 705/313 |
| 2014/0279225 | A1 * | 9/2014 | Friedman | G06Q 30/0623 |
| | | | | 705/26.35 |
| 2015/0186953 | A1 * | 7/2015 | Gross | G06Q 30/0276 |
| | | | | 705/14.58 |
| 2015/0269151 | A1 * | 9/2015 | Wallace | H04L 67/1085 |
| | | | | 705/314 |
| 2016/0055602 | A1 * | 2/2016 | Howe | H04N 7/183 |
| | | | | 705/314 |
| 2016/0196625 | A1 * | 7/2016 | Adamson | G06Q 10/10 |
| | | | | 705/313 |
| 2017/0091885 | A1 * | 3/2017 | Randolph | G06Q 50/16 |
| 2018/0158113 | A1 * | 6/2018 | Bisson | G06Q 50/16 |
| 2018/0158156 | A1 * | 6/2018 | Dintenfass | G06F 21/32 |
| 2019/0251520 | A1 * | 8/2019 | Bentley, III | G06Q 50/163 |
| 2019/0251645 | A1 * | 8/2019 | Winans | G06V 20/10 |
| 2021/0090179 | A1 | 3/2021 | Schreier | |
| 2021/0312789 | A1 * | 10/2021 | Linn | G08B 25/007 |
| 2022/0335596 | A1 * | 10/2022 | Urklinski | G01M 3/002 |
| 2022/0366507 | A1 * | 11/2022 | Linn | G06Q 50/163 |
| 2023/0076429 | A1 | 3/2023 | Winans | |
| 2023/0164296 | A1 * | 5/2023 | Chang | G06F 3/0485 |
| | | | | 348/14.09 |
| 2024/0331067 | A1 * | 10/2024 | Winans | G06Q 40/08 |
| 2024/0354877 | A1 * | 10/2024 | Stricker | G06Q 50/16 |
| 2024/0394015 | A1 * | 11/2024 | Fagan | G10L 15/22 |
| 2024/0394815 | A1 * | 11/2024 | Venkataraman | G06Q 30/0631 |

* cited by examiner

150

152     154

| Features | Information |
|---|---|
| Foundation | |
| Roof | |
| Exterior finish | |
| HVAC System | |
| Fireplace | |
| Refrigerator | |
| Kitchen Sink | |

⋮

| Electrical Panel | |
|---|---|
| Attic | |

INSPECTION APPARATUS AND METHODS

CROSS-REFERENCE TO RELATED APPLICATIONS

This application claims the benefit of U.S. Provisional Application No. 63/468,197, filed May 22, 2023, which is hereby incorporated herein by reference in its entirety.

FIELD

This disclosure relates to devices, systems and associated methods for conducting inspections such as property inspections.

BACKGROUND

In most real estate property purchase transactions, a property inspection is conducted to facilitate purchase of the property. Indeed, a purchase contract is often contingent on the results of the property inspection. A property inspector conducts the inspection of the property, observing and recording information about the features of the home such as major functioning systems of the property (e.g., heating, ventilation and air conditioning (HVAC) systems, electrical systems, and plumbing) as well as specific fixtures, appliances, systems, or structural components of the property (e.g., plumbing fixtures, electrical equipment, and roof covering). The property inspector typically includes information about these features in a property inspection report.

There are some existing property inspection software tools that a property inspector can use to enter information about the property during an inspection. These programs often present the user with pre-defined flows, e.g., "System by System" or "Room by Room" that the inspector follows as they conduct the inspection. These predefined flows, however, may not match a property inspector's personal preference or the special circumstances of each property. Following these flows often results in the property inspector spending a significant amount of time operating the program to enter data rather than observing the property. Some property inspection tools have attempted to address this problem by allowing the inspector to customize the workflows, however, such programs that use a workflow approach, even if customizable, are still problematic in that if an inspector has forgotten to make note about a certain condition of a feature of the property before switching to the next feature, the inspector may waste time backing out of the workflow to enter the data about that previous feature. Moreover, operating such existing software tools is time consuming and cumbersome. For example, to enter information about a particular feature, the inspector may be required to manually navigate to (e.g., "drilling down" to and/or backing out of) each feature within the program. For example, to enter information about a particular feature, the inspector may have to select the property, then navigate to and select the room including the feature, then navigate to and select the feature, and then enter the information for the desired feature. To then enter information about another feature of another room, the user may have to back out of the currently displayed feature and room and then drill down to the desired feature to enter the information as described above.

Furthermore, property inspections may be conducted during the winter or otherwise during cold weather. It is not uncommon for property owners, such as homeowners, selling their unoccupied property to keep the heat in the buildings at a lower temperature to reduce their heat bills. In these colder conditions, manipulation of buttons on a smartphone or other computing device is difficult, particularly where the property inspector is wearing gloves.

DETAILED DESCRIPTION

Figure 1:
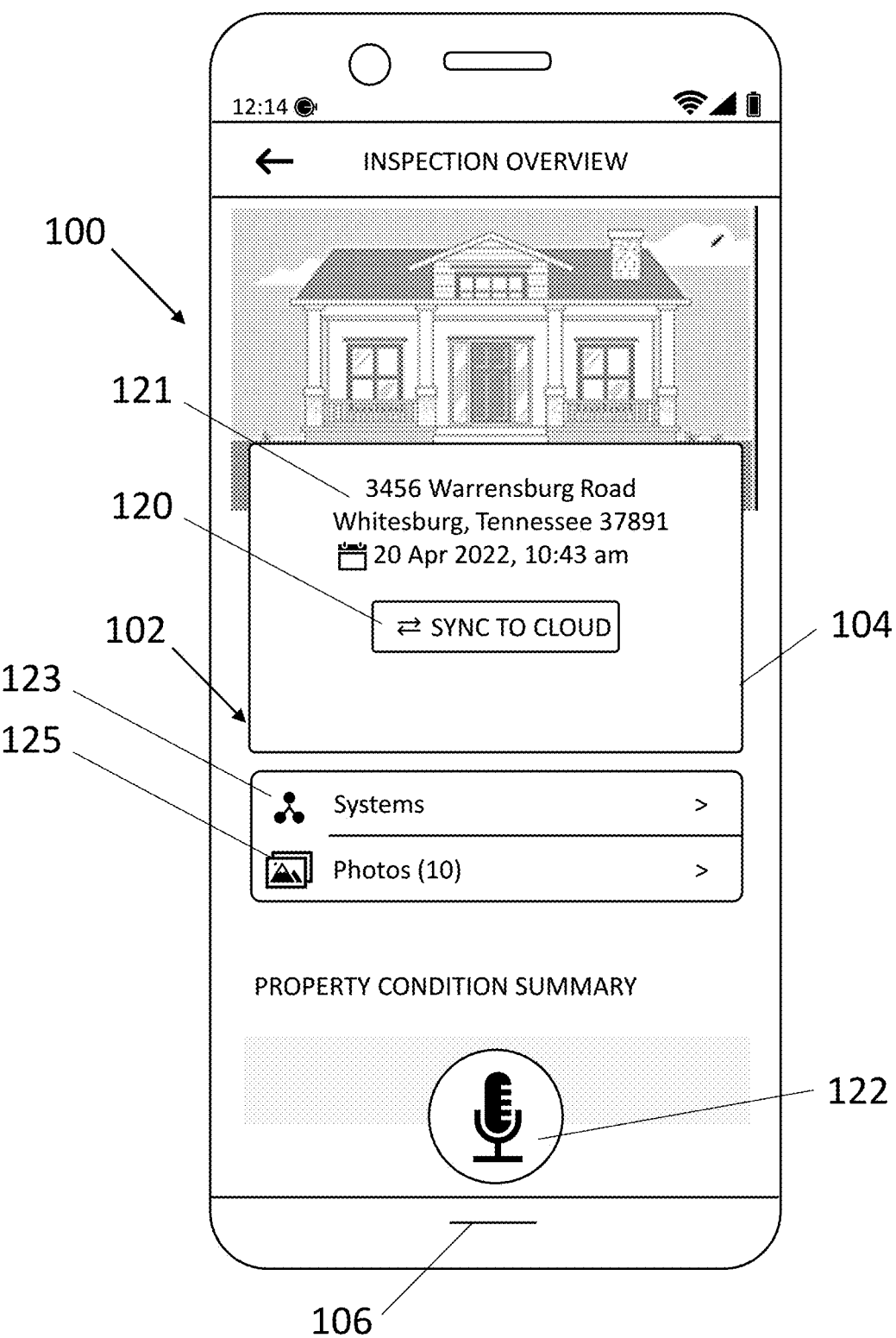
FIG. 1 is a front view of a mobile computing device having a display screen presenting a graphical user interface of a property inspection application.
Figure 2:
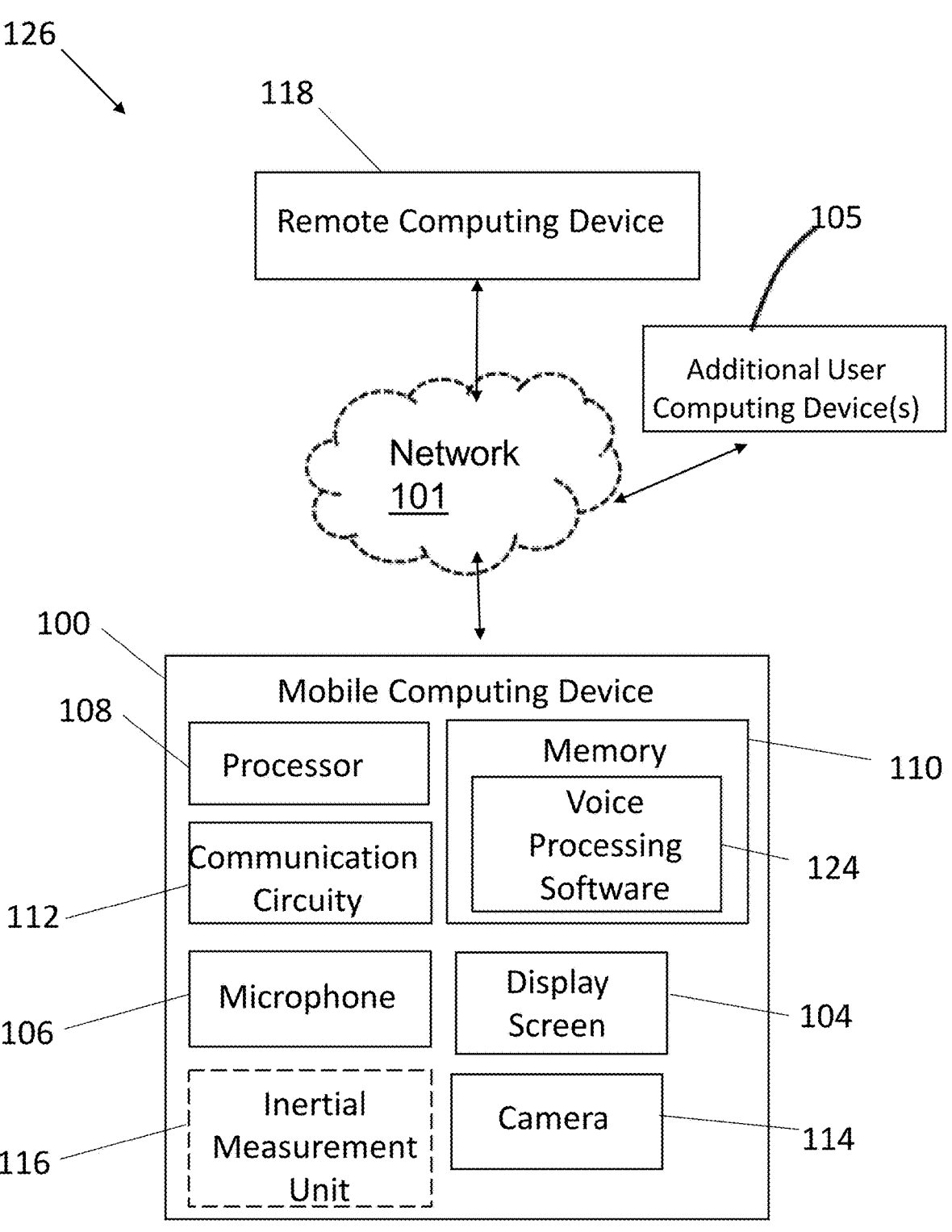
FIG. 2 is an example block diagram of a property inspection system including the mobile computing device of FIG. 1.

With reference to FIGS. 1 and 2, a mobile computing device 100 is provided that a user, such as a property inspector, may use to conduct property inspections. The mobile computing device 100 may be, as examples, a smartphone, tablet computer, and/or a personal computer, among other options. The mobile computing device 100 may include software, such as a property inspection application, that may be used to enter and store information about the property being inspected. In some embodiments, the software also may facilitate a customizable workflow. The software may be a program installed on the mobile computing device 100, for example, a smartphone application.

The mobile computing device 100 typically includes a user interface 102 including a display screen 104 that is configured to present a graphical user interface of the property inspection application to the user. As one example, the display screen 104 may be a touchscreen display. The user interface 102 may also include a microphone 106 through which the user may input voice data. As discussed in further detail below, the user may use voice input to enter information about features of the property and/or control the property inspection application. In one aspect, the property inspection application may process the voice input to identify a feature of the property and a descriptor associated with the feature in the voice input and associate the descriptor with the identified feature in the application, even if the identified feature is not currently displayed to the user on the display screen. In another aspect, the property inspection application may process the voice input to identify a command and a feature of the property from the voice input and control the property inspection application based on the command and the feature. For instance, the voice input may include the command "go to" and the feature "refrigerator" and the property inspection application, upon identifying these terms by processing the voice input, may update the graphical user interface to present a page associated with the feature "refrigerator" via the display screen without the user having to manually navigate to the refrigerator feature within the application.

By some approaches, the processed voice input may be correlated with or assigned to one or more fields. For example, the user interface may or may not be updated or "go to" a particular feature, but the information related to that feature may be updated according to the voice input. Further, in some embodiments, the feature, descriptor, or other aspect information received via the voice input may be input into more than one field. In this manner, an inspector may input global changes to more than one field of a property inspection report.

With respect to FIG. 2, the mobile computing device 100 may include a processor 108, memory 110, communication circuitry 112, the display screen 104, the microphone 106, and a camera 114. The processor 108 is in communication with the memory 110, communication circuitry 112, display screen 104, microphone 106, and camera 114. The memory 110 may store software programs and data accessible by the processor 108 to provide functionality to the mobile computing device 100. For example, the memory 110 may store the software code for the property inspection application. In addition, the memory 110 may store information about one or more properties to be inspected. For example, the memory may store a set of features with each property that the user may enter information about when conducting an inspection of the property.

The processor 108 may communicate with remote devices via the communication circuitry 112. The communication circuitry 112 may be configured to communicate via one or more wireless protocols such as cellular, Wi-Fi, Bluetooth, Zigbee and the like. For instance, the processor 108 may communicate with a remote computing device 118, such as a server computer, to retrieve and send information. The mobile computing device 100 and the remote computing device 118 may together form a property inspection system 126 for inspecting properties. The mobile computing device 100 may communicate to the remote computing device 118 via a network 101 such as a cellular network, the Internet, and/or other network solutions. By some approaches, one or more additional computing devices 105 may be employed to conduct a property inspection. Similar to the mobile computing devices 100 described a above, the additional computing devices 105 may include, e.g., a smartphone, a tablet computer, and/or a personal computer, among others.

In some approaches, the processor 108 may retrieve information about a property from the remote computing device 118 for use when inspecting the property using the property inspection application. In some forms, a user may enter data about a property for inspection at a personal computer, such as an additional user computing device 105 to set up a property for inspection via the application. The entered data of the property may be stored in a data structure that is stored in a database management system of the property inspection system 126. The data of the property associated with the property for inspection is referred to herein as a property file. For instance, some users may find it faster or prefer to enter general details about the property using a personal computer. For example, the user may create a property file for use on the inspection application of the mobile computing device 100 and enter information such as an address of the property and or features of the property to be inspected such as system of the property, the number and/or types of rooms in the building, and/or items of each system or room. The additional user computing device 105 may then communicate with the remote computing device 118 such as a server over the network 101 to store the property file for access by the mobile computing device 100 and/or to communicate the property file to the mobile computing device 100. The user that creates the file may be the same or different than the user that actually completes the property inspection using the mobile computing device 100.

The property file may be stored in the remote computing device 118. The user may retrieve the property file from the remote computing device 118 by requesting the property file from the remote computing device 100. For example, the user may use the inspection application to search for property files available from the remote computing device 118. The inspection application may communicate with the remote computing device 118 to retrieve a list of property files and present the list to the user. The inspection application may present property files associated with a user account or user profile of the inspector. The user may select one or more property files to download to the mobile computing device 100 or otherwise associate the property files with their user profile within the property inspection application. The user may then open the property file using the inspection application to begin entering and/or reviewing information about the property and its associated features. The user may use the inspection application to modify the property file, for example, to add or remove one or more features from the property file.

When changes to the property file or inspection application are input, including once the inspection is complete, the user may upload the property file, or information about the property that the user entered into the inspection application, to the remote computing device 118 for storage and/or further processing (e.g., generation of an inspection report). Depending on connectivity of the network 101, the system may be configured to upload information in a batch manner, such as once the inspection is completed. The inspection application may also be able to sync the property file of the mobile computing device 100 with the property file of the remote computing device 118. To provide a user additional control in these regards, the inspection application may include a sync button 120, e.g., a virtual button of the graphical user interface of the inspection application, that the user may select to sync the property files of the mobile computing device 100 and remote computing device 118. In some forms, the property files are synced automatically. Additionally or alternatively, the property files may be synced periodically and/or when the mobile computing device 100 is connected to a network, such as a Wi-Fi network. Syncing the property file may include uploading information the user entered about the property using the inspection application on the mobile computing device 100 to the remote computing device 118.

The inspection application may also be configured to permit the user to create the property file (e.g., a list of features associated with a property address to be inspected) using the mobile computing device 100. The property file may be uploaded to the remote computing device 118 for storage and/or processing. Information entered into the property file about the features of the property may also be uploaded to the remote computing device 118.

The processor 108 may control the display screen 104 to present a graphical user interface of the property inspection application to a user. The user may operate the graphical user interface to create a property file for a property and enter information about the features of the property. In some configurations, the property inspection application may include a home page listing one or more properties for which the inspection application has a property file. The user may use the user interface 102 to select a property to inspect and begin entering information about the property or to review and/or edit information that was previously entered about that property. With reference again to FIG. 1, upon selecting the desired property, the graphical user interface may present identifying information 121 about the property being inspected such a name or address of the property. The property file for the property typically includes a list of a plurality of features associated with the property in memory 110. Features of the property may include, as examples, systems of the property (e.g., HVAC systems, electrical systems, plumbing systems), building of the property (e.g., house, garage, shed), rooms of a building of the property (e.g., kitchen, primary bedroom, primary bathroom, living room), and items in each room (e.g., fixtures and appliances such as a fireplace, refrigerator, washing machine, toilet, sink, fans). The user may select to view the features of the property by selecting the button 123 labeled systems to view the systems of the property and manually drill down to each feature associated with the property. In this manner, the user may view details of these features. The user also may view the photos associated with the property by selecting the button 125 labeled photos.

Figure 3:
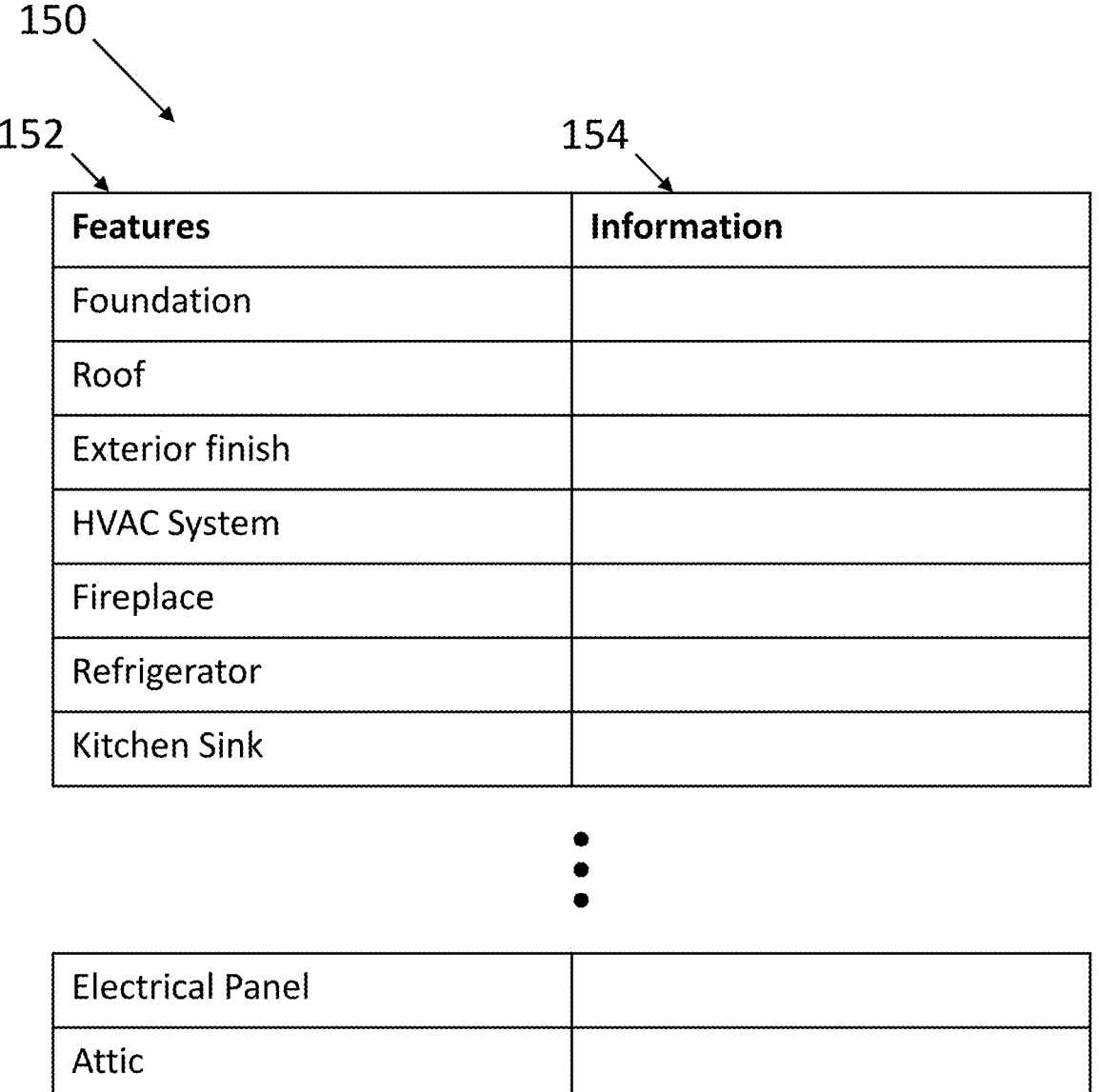
FIG. 3 is an example of a data structure of the property inspection application of FIG. 1 associating information with each feature.

In one illustrative embodiment, each of the features associated with a property includes an associated information field into which information about that feature may be entered and stored. The inspection application may include a data structure stored in memory 110 that associates each feature of the property with information entered about the property. With reference to FIG. 3, an example database 150 is provided that may be used to store information (e.g., descriptors and photos) about each feature of property in the memory 110. The database 150 includes a set of features 152 that are each associated with information 154 (e.g., description, comment, disclaimer) entered for that feature.

When the user selects, navigates to, or otherwise views a page of the inspection application for a specific feature, the graphical user interface may display the name of the feature and an interactive feature of the graphical user interface that the user may select (e.g., click or tap) to enter information about the feature. As one example, the interactive feature of the graphical user interface is a text field that the user may select to begin typing or entering information via the microphone. As another example, the interactive features is a virtual button the user may select to access a text field to enter information about the feature by voice or typing. In yet other configurations, the interactive feature may have a binary selection to make or even a drop down with multiple, selectable options. Where information has already been entered for a feature, upon viewing the feature the inspection application may present the information stored in the information field 154 of the database 150 to the user via the graphical user interface.

In some forms, the property inspection application is configured such that the user may navigate to each feature manually by using the graphical user interface as described above with respect to the conventional inspection software tools. The features may be organized in a hierarchy in the application, with some features being presented as sub-features of the higher-level features of the property. For example, the items of a room may be sub-features of the room. For instance, if the user desires to enter information about the fireplace in the living room, the user may select a virtual button of the graphical user interface for the living room to view a listing of the items associated with the living room in the property inspection application. The user may scroll through the list of items and select a virtual button for the fireplace to open an input field where the user may enter information about the fireplace. For example, the user may select a text box and type a note about the fireplace. The note may include information about the condition (e.g., damaged, issue affecting normal operation, cosmetic issue), a disclaimer (not able to access or view), or some other comment about the fireplace. In other examples, the size, dimensions, or location of the fireplace may be stored in this field.

Figure 4A:
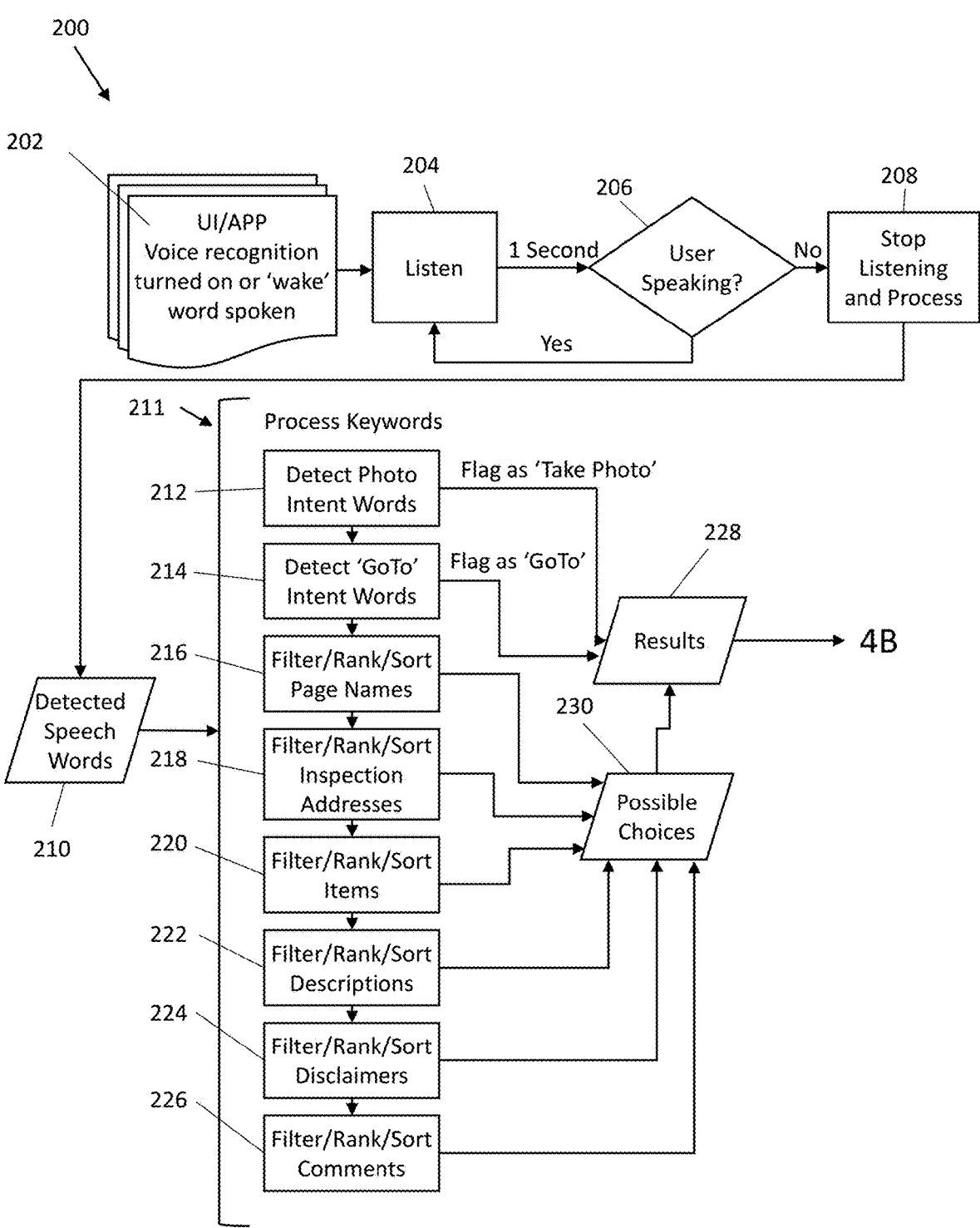
FIGS. 4A-4B show a flow diagram of a process for operating the property inspection application.
Figure 4B:
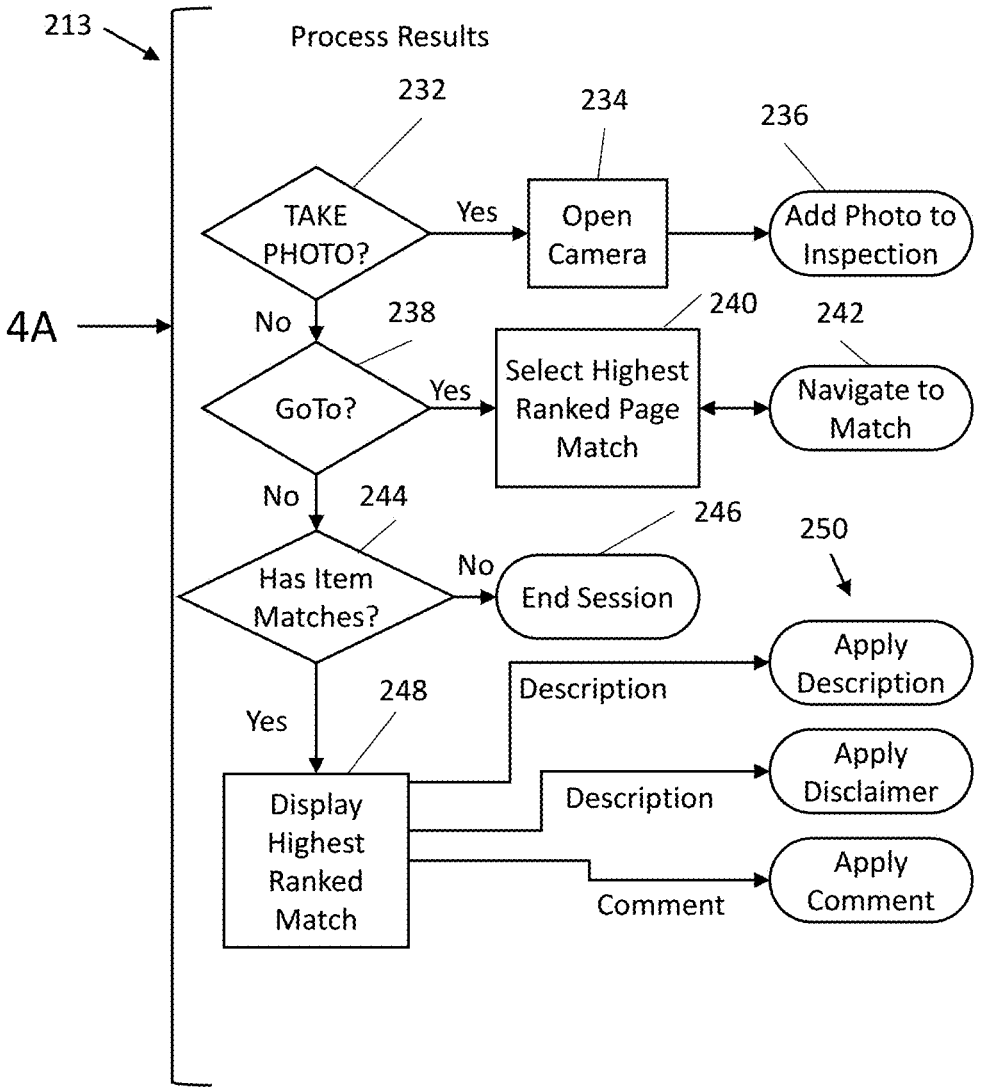

The inspection application also permits the user to enter information orally or to control the inspection application using the microphone 106. With respect to FIGS. 4A-4B, the inspection application may perform a method 200 for receiving and processing the voice input of a user. The method 200 begins when the processor 108 determines 202 the user would like to use voice input, e.g., to enter information or control the application. The graphical user interface of the inspection application may present a button 122 (see FIG. 1) associated with the microphone 106 that the user may select to activate the microphone 106. The processor 108 may receive input that the microphone button 122 has been selected and determine the user would like to use voice input. Additionally or alternatively, the processor 108 may receive and process audio data from the microphone 106 continuously and listen for a "wake" or activation word to be spoken by the user. The activation word may be a word or phrase, for example, "HomeGauge®" or "Hey HomeGauge®" or the like. The processor 108 may determine the user would like to use voice input upon detecting the activation word.

Upon determining the user would like to use voice input, the processor 108 listens 204 for voice data (e.g., receives and stores) of the user by receiving audio data from the microphone 106. The processor 108 may periodically determine 206 if the user is still speaking based on the audio data from the microphone 106. For example, the processor 108 may determine if the user has stopped speaking for a period of time, e.g., one second. Upon determining the user is still speaking the processor 108 returns to step 204 to listen for audio data.

Upon determining the user has stopped speaking, the processor 108 ceases listening for audio data and processes 208 the received audio data. In some forms, the inspection application requires the user to continue pressing the button 122 while speaking. The processor 108 may listen 204 for voice data until the processor 108 determines that the user has released the button 122 at which point the processor 108 ceases listening for audio data and processes 208 the received audio data. The processor 108 may process the audio data using voice processing software 124 of the inspection application. The voice processing software 124 may detect spoken words from the raw audio data. In some forms, the voice processing software 124 is trained or provided with a list of words that are likely to be spoken by a property inspector. For example, all of the features of the property file may be provided to the voice processing software 124 as words that may be found in the audio data to aid the voice processing software 124 in interpreting the voice input of the user. As another example, words often used in inspection reports may be provided to the voice processing software 124 as words that may be found in the audio data to be processed. The processor 108 may use the voice processing software 124 to output detected speech words 210. The voice processing software 124 may use machine learning to process the voice input of the user to predict words spoken by the user. The voice processing software 124 may continue to learn words and the user's voice over time as the user confirms or cancels the text that the inspection application proposes to enter for a feature or descriptor as described below.

The processor 108 may further process the detected speech words 210 by determining 211 whether the detected speech words include various keywords of the inspection application and processing 213 the results of the keyword determination. In the keyword determination step 211, the processor 108 may process the detected speech words 210 to detect 212 words that indicate an intent to take a photo with the camera 114. Such words could include, as examples, words or phrases such as "photo," "picture," "capture photo," and "take photo." The processor 108 may output whether such words were detected to the results 228. The processor 108 may process the detected speech words 210 to detect 214 words that indicate an intent to go to another page of the inspection application. Such words could include, as examples, words or phrases such as "go to," "open," and "show me." The processor 108 may output whether such words were detected to the results 228.

The processor 108 may process the detected speech words 210 to determine 216 if the detected speech words 210 match any page names of the inspection application (e.g., "Photo Gallery"). The processor 108 may filter, rank, and sort the matches to output possible page names 230 in detected speech words 210. For instance, the processor 108 may filter out any pages of the inspection application that the user does not have access to based on their permissions. The processor 108 may rank each possible page by calculating a score for each possible page based on the number of matching keywords or exact matches the page names have to the detected speech words 210. The processor 108 may sort the pages based on their rank or associated scores to identify which pages are the most likely matches to the detected speech words 210.

The processor 108 may process the detected speech words 210 to determine 218 if the detected speech words 210 match any inspection addresses of the inspection application, for example, physical addresses of the property files stored in the inspection application (e.g., "200 West Diversey"). The processor 108 may filter, rank, and sort the matches to output possible property addresses 230 in the detected speech words 210. For instance, the processor 108 may filter out any inspection addresses that do not match certain criteria from consideration. For example, an inspection address where the inspection has been canceled may be filtered from the results. The processor 108 may rank each possible inspection address by calculating a score for each possible inspection address based on the number of matching keywords or exact matches the inspection address has to the detected speech words 210. The processor 108 may sort the inspection addresses based on their rank or associated scores to identify which inspection addresses are the most likely matches to the detected speech words 210.

The processor 108 may process the detected speech words 210 to determine 220 if the detected speech words 210 match any features or items of the inspection application, for example, features associated with a property file stored in the inspection application. The processor 108 may filter, rank, and sort the matches to output possible features or items 230 in the detected speech words 210. For instance, the processor 108 may filter out any features or items in the inspection taxonomy that have been removed from the user's library or the inspection. For example, an inspector that does not inspect elevators may remove the item "elevator" from their inspection taxonomy. The processor 108 may rank each possible feature by calculating a score for each possible feature based on the number of matching keywords or exact matches the feature has to the detected speech words 210 (e.g., "electrical panel"). The processor 108 may sort the features based on their rank or associated scores to identify which features are the most likely matches to the detected speech words 210.

The processor 108 may process the detected speech words 210 to determine 222 if the detected speech words 210 are a description of a feature of the property of the inspection application. The processor 108 may filter, rank, and sort the possible descriptions to output possible descriptions 230 as discussed below. The processor 108 may process the detected speech words 210 to determine 224 if the detected speech words 210 are a disclaimer relating to a feature of the property of the inspection application. The processor 108 may filter, rank, and sort the possible disclaimers to output possible disclaimers 230 as discussed below. The processor 108 may process the detected speech words 210 to determine 226 if the detected speech words 210 are a comment of a feature of the property of the inspection application. The processor 108 may filter, rank, and sort the possible comments to output possible comments 230. The processor 108 may filter out any descriptions, disclaimers, or comments in the inspection taxonomy that have been removed from the user's library or the inspection. For example, an inspector that does not inspect elevators may remove the item "elevator" from their inspection taxonomy such that the inspection application disregards all descriptions, disclaimers, or comments associated with elevators. The processor 108 may rank each description, disclaimer, or comment by calculating a score for each possible description, disclaimer, or comment based on the number of matching keywords or exact matches the description, disclaimer, or comment have to the detected speech words 210. The processor 108 may sort the descriptions, disclaimers, and comments based on their rank or associated scores to identify which descriptions, disclaimers, or comments are the most likely matches to the detected speech words 210.

The possible choices 230 from the above steps are added to the results 228 of the keyword determination step 211. The results 228 of the keyword determination step 211 may then be processed 213. The processor 108 may determine 232 if the results 228 indicate that the user desires to take a photo. If the processor 108 determines the user desires to take a photo, the processor 108 may open 234 the camera 114 of the mobile computing device 100 to permit the user to take a photo with the camera 114, for example, by pressing a virtual button displayed on the graphical user interface. In some forms, upon determining the user desires to take a photo, the processor 108 may open 234 the camera 114 and capture a photo. The processor 108 may open 234 the camera 114 and provide the user with a few seconds to point the camera 114 toward the object(s) the user desires to capture a photo of. In some forms, the inspection application may display a countdown (e.g., from five seconds) to indicate to the user when the photo will be taken by the camera 114. Automatically capturing the photo allows the user to capture the photo without having to manually press a button on the display screen. This may be beneficial where manual operation of the mobile computing device is difficult, for example where the property inspector is wearing gloves or the temperature is cold such that the property inspector's dexterity is impaired. The photo that is captured may be stored 236 in the memory 110 and associated with a feature of the property. In some forms, the photo is associated with the feature that is currently displayed to the user on the graphical user interface via the display screen. For example, if the graphical user interface is displaying the "stove" page and input field and the user says "take photo," the processor 108 may associate the subsequently captured photo with the stove feature. In some forms, the photo may be associated with a feature based on other keywords identified in the voice input (e.g., at step 220). For example, where the graphical user interface is displaying the "stove" page and input field and the user says "take a photo of kitchen refrigerator," the processor 108 may associate the subsequently captured photo with the refrigerator of the kitchen rather than the stove.

Where the processor 108 determines the user has not spoken words indicating an intent to take a photo, the processor 108 may determine 238 if the results 228 indicate that the user desires to go to a specific page of the inspection application. If the processor 108 determines the user desires to go to a specific page (e.g., having spoken the words "go to" or other such words of intent), the processor 108 may select 240 the highest ranked page match from step 216 and control the inspection application to present 242 that page via the display screen 104. For example, if the user spoke the words "go to HVAC system," the processor 108 determines that the user desires to go to a certain page upon identifying the intent words "go to." The processor 108 may have also determined at step 216 that the detected speech words 210 included the words "HVAC system" that most closely correspond to the page for "HVAC system." The processor 108 thus opens the page for the HVAC system.

Where the processor 108 determines the user has not spoken words indicating an intent to go to a specific page, the processor 108 may determine 244 if there were any matches in step 220 of the detected speech words 210 to features or items of the property file of the inspection application. If there were no matches in step 220, the process ends 246 and the processor 108 does not apply any description, disclaimer, or comments from steps 222, 224, 226 to a feature or item. If there were matches in step 220, the processor 108 may display 248 the page corresponding to the highest ranked item match, and apply 250 the highest ranked descriptor (e.g., the description, disclaimer, or comment of steps 222, 224, 226) to highest ranked item. In some forms, the processor 108 applies the descriptor to the item without navigating to the page for the item in the inspection application. For example, where the inspection application is currently displaying a page for the foundation of the house and the user speaks "primary bathroom sink has a leaking drain pipe," the processor 108 may apply the descriptor "leaking drain pipe" to the item "primary bathroom sink" without navigating away from the page for the foundation. The user may thus enter descriptors for various items on the property without having to manually navigate within the inspection application to each page to enter a descriptor. This is advantageous in that a user can quickly enter information about various items in the home as they observe them or think of information to input without having to waste time navigating to the page for the item to enter the information. For instance, where the inspector is entering information about the foundation of the house, but remembers they forgot to enter a descriptor about the leaking drain pipe in the primary bathroom, the user can quickly add the description to the primary bathroom sink without having to navigate to the page for the primary bathroom sink and then navigate back to the page for the foundation.

Figure 5:
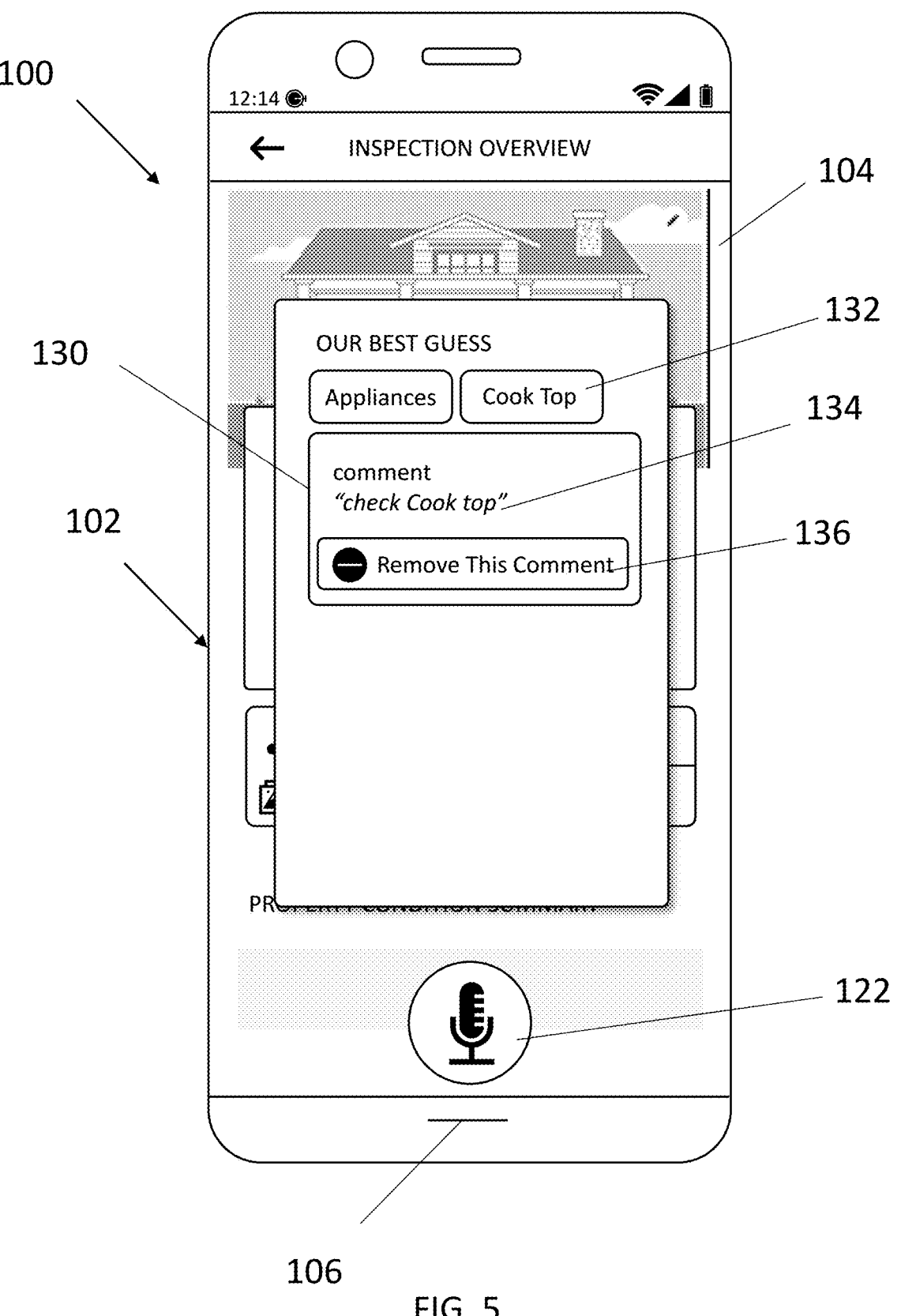
FIG. 5 is front view of the mobile computing device of FIG. 1 displaying a graphical user interface display responsive to receiving voice input.

In some forms, when the user enters a descriptor for an item using voice input, the inspection application may present a confirmation window to the user on the graphical user interface. With reference to FIG. 5, an example confirmation window 130 is shown. In this example, the user was on the home page (shown in FIG. 1) when they used the microphone 106 to provide the voice input "check cook top." As shown, the confirmation window 130 is displayed over the home page. The user may use the confirmation window 130 to confirm that descriptor is accurate and will be applied to the correct item, and then return to the page they were on when they entered the voice input (e.g., the home page). Thus, the user may use voice input to enter information without disrupting their workflow or other task being performed on the currently displayed page of the inspection application.

The confirmation window 130 displays the identified item 132 and the identified descriptor 134 that will be applied to the identified item if approved. The user may thus use the confirmation window 130 to visually confirm that the inspection application accurately identified the item and the descriptor the user provided via voice input. Where the user determines that the descriptor is incorrect or will be applied to the wrong item, the user may select a button 136 of the confirmation window 130 to remove the descriptor or cancel the descriptor from being applied to the item. As another example, the user may use voice input and speak the words "cancel" or "delete" which, when received and processed, causes the inspection application to remove the descriptor or cancel the descriptor from being applied to the item. In some forms, the user may edit the text of the descriptor 134 to be applied to the identified item 132 in the confirmation window 130. If the identified item 132 and identified descriptor 134 are correct, the user may click to the side of the confirmation window 130 to return to the page they were on before providing the voice input. Additionally or alternatively, the confirmation window 130 may be displayed for a period of time (e.g., five seconds) and if the cancel button 136 is not selected, the inspection application automatically confirms the entry and returns to the page displayed before the voice input was received.

In some approaches, upon processing the user's voice input, the inspection application displays a list of the top item/descriptor matches as options for the user to select from in the confirmation window 130. The user may then select which option the user would like to enter. The confirmation window 130 may display the top match, such as the item/descriptor the inspection application determines to be the most likely, with a confirmation button for the user to select to enter the displayed descriptor with the item. If the top match is not correct, the user may select one of the other displayed options to apply the selected option. Upon selecting another option, the inspection application may present a button for the user to select to enter the selected descriptor with the item.

In some forms, upon processing the user's voice input, the inspection application may provide audio feedback to the user in addition to or as an alternative to displaying the confirmation window 130. For instance, when the user enters a descriptor for an item using voice input, the inspection application may output an audio message via a speaker of the mobile computing device 100 permitting the user to confirm the inspection application has interpreted the user's voice input correctly. For example, when the user enters voice input such as "dishwasher is inoperable," the inspection application may output an audio message as feedback for the user to confirm whether the voice input was properly interpreted, e.g., "setting dishwasher as inoperable" before applying the descriptor to the identified item. Where the inspection application does not interpret the voice input correctly, for example, the audio message of the inspection application is instead "setting the dishwasher as operable," the user may provide another voice input, e.g., "cancel," to stop the inspection application from entering the incorrect information.

In some forms, the mobile computing device 100 includes an inertial measurement unit (IMU) 116. The processor 108 may receive data from the IMU 116 to detect gestures made by the user with the mobile computing device 100. For example, the user may quickly move the mobile computing device 100 in predetermined patterns to input commands. In one example, when the confirmation window 130 is displayed, the user may flick the mobile computing device 100 to the right to confirm the descriptor and item are correct and may flick the mobile computing device 100 to the left to cancel the descriptor from being applied to the item.

The inspection application may also review the set of features 152 associated with the property and prompt the user to enter information about one or more of the features. For example, upon the inspector indicating that they have completed the inspection, the inspection application may review the information 154 associated with features 152 to ensure the inspector has not inadvertently forgotten to enter information about a feature. For example, the inspection application may determine that an information field 154 associated with a feature 152 is empty and notify the user to confirm whether they would like to enter information into this field or to leave the field empty. In some forms, the inspection application compares the set of features 152 and/or the information entered into the information fields 154 with a dataset of inspection reports of similar properties to identify if the inspection report is missing information typically included in inspection reports for similar properties. For example, if the inspection report is for a residential property and the inspector did not enter information about the HVAC system, the inspection application may determine, based upon a comparison with the inspection reports of other residential properties, that such homes typically include an HVAC system. The inspection application may then notify the user to confirm whether this field was intentionally left blank or prompt the user to enter such information if applicable. The inspection apparatus may also process the information in the informational fields 154 and prompt the user to enter additional information or more detail based on the currently entered information, for example, based on a comparison with inspection reports of other similar properties or where similar issues have been noted.

While the above discussion primarily relates to using the mobile computing device 100 and inspection application to conduct property inspections, those having skill in the art will readily understand applicability of the teachings and techniques disclosed herein to other types of inspections.

Uses of singular terms such as "a," "an," are intended to cover both the singular and the plural, unless otherwise indicated herein or clearly contradicted by context. The terms "comprising," "having," "including," and "containing" are to be construed as open-ended terms. It is intended that the phrase "at least one of" as used herein be interpreted in the disjunctive sense. For example, the phrase "at least one of A and B" is intended to encompass A, B, or both A and B.

While there have been illustrated and described particular embodiments of the present invention, those skilled in the art will recognize that a wide variety of modifications, alterations, and combinations can be made with respect to the above described embodiments without departing from the scope of the invention, and that such modifications, alterations, and combinations are to be viewed as being within the ambit of the inventive concept.

What is claimed is:

1. A method of conducting a property inspection, the method comprising:

presenting a graphical user interface of an inspection application to a user via a display screen of a user device, the inspection application including a plurality of features of a property and an associated information field corresponding to each of the plurality of features for information about the feature;

receiving voice input from the user;

identifying, from the voice input, a feature of the property in the voice input regardless of whether the feature is presented to the user on the display screen;

processing the voice input to identify a descriptor in the voice input; and associating, in a memory, the descriptor with the feature, wherein identifying the feature of the property in the voice input includes comparing at least a portion of the voice input with each of the plurality of features of the property in the inspection application, wherein associating the descriptor with the feature includes entering the descriptor in the information field associated with the feature, the method further comprising presenting a confirmation when the descriptor is entered.

2. The method of claim 1 further comprising:

determining one or more features of the plurality of features for which information has not been entered into the associated information field; and prompting, via the inspection application, the user to enter information about the one or more features.

3. The method of claim 1 further comprising requesting additional information based at least in part on the descriptor upon associating the descriptor with the feature.

4. An apparatus for conducting a property inspection, the apparatus comprising:

a display screen to present a graphical user interface of an inspection application, the inspection application configured to display one or more features of a property and an associated information field corresponding to each of the one or more features to enter information about each feature;

a microphone;

a memory storing a plurality of features relating to the property and configured to store information associated with each of the plurality of features; and a processor in communication with the display screen, microphone, and memory, the processor configured to:

present the graphical user interface via the display screen;

receive voice input via the microphone;

identify, from the voice input, a feature of the plurality of features of the property in the voice input regardless of whether the feature is presented via the display screen;

determine, from the voice input, a descriptor associated with the feature; and store, in the memory, the descriptor in association with the feature, wherein to identify the feature of the property in the voice input includes comparing at least a portion of the voice input with each of the plurality of features of the property stored in memory, wherein to store the descriptor in association with the feature includes entering the descriptor in the information field corresponding to the feature, wherein the processor is further configured to present a confirmation when the descriptor is entered.

5. The apparatus of claim 4 wherein the processor is further configured to:

determine at least one feature of the plurality of features with which information has not associated; and prompt, via the inspection application, the user to enter information about the at least one feature.

6. The apparatus of claim 4 wherein the processor is further configured to request additional information based at least in part on the descriptor upon storing the descriptor in association with the feature.

7. A method of conducting a property inspection, the method comprising:

receiving voice input from a user at a user device running an inspection application, the inspection application configured to display one or more features of a property and an associated information field corresponding to each of the one or more features into which information about the feature is able to be entered;

identifying a command from the voice input to control the inspection application;

identifying a feature from the voice input including comparing at least a portion of the voice input with each of the one or more features of the property;

upon identifying a command from the voice input, controlling the inspection application based at least in part on the identified command and feature of the voice input;

upon identifying a descriptor in the voice input, associating the descriptor with the feature including entering the descriptor in the information field associated with the feature;

determining at least one feature of the one or more features for which information has not been entered into the associated information field; and prompting the user to enter information about the at least one feature.

8. The method of claim 7 wherein the command is to navigate to the feature within the inspection application, wherein controlling the inspection application includes updating a graphical user interface of the inspection application to display the feature and the associated information field via a display screen of the user device.

9. The method of claim 7 wherein the command is to capture a photo, wherein controlling the inspection application includes opening a camera application of the user device and associating a captured image with the feature of the voice input.

10. An apparatus for conducting a property inspection, the apparatus comprising:

a display screen to present a graphical user interface of an inspection application, the inspection application configured to display one or more features of a property and an associated information field corresponding to each of the one or more features to enter information about each feature;

a microphone; and a processor in communication with the display screen and microphone, the processor configured to:

receive voice input via the microphone;

identify a command from the voice input to control the inspection application;

identify a feature from the voice input including comparing at least a portion of the voice input with each of the one or more features of the property;

upon identifying a command from the voice input, control the inspection application based at least in part on the identified command and feature of the voice input;

upon identifying a descriptor in the voice input, associating the descriptor with the feature including entering the descriptor in the information field associated with the feature;

determine at least one feature of the one or more features for which information has not been entered into the associated information field; and prompt the user via the inspection application to enter information about the at least one feature.

11. The apparatus of claim 10 wherein the command is to navigate to the feature within the inspection application, wherein to control the inspection application includes updating the graphical user interface of the inspection application to display the feature and the associated information field via the display screen.

12. The apparatus of claim 10 further comprising a camera in communication with the processor, wherein the command is to capture a photo, wherein to control the inspection application includes operating the camera and associating a captured image with the feature of the voice input.

* * * * *